United States Patent [19]

Sundermann et al.

[11] 3,978,028

[45] Aug. 31, 1976

[54] PROCESS FOR PREPARING s-TRIAZINE PREPOLYMERS BY CONDENSATION OF AN AROMATIC POLYHYDROXY COMPOUND WITH CYANURIC CHLORIDE AND THEREAFTER REACTING THE CONDENSATION PRODUCT WITH CYANOGEN HALIDE IN THE PRESENCE OF BASE

[75] Inventors: Rudolf Sundermann, Leverkusen; Rolf Putter, Duesseldorf; Ernst Grigat, Cologne, all of Germany

[73] Assignee: Bayer Aktiengesellschaft, Leverkusen, Germany

[22] Filed: Dec. 4, 1974

[21] Appl. No.: 529,663

[30] Foreign Application Priority Data

Dec. 6, 1973 Germany............................ 2360709

[52] U.S. Cl. ................................ 260/61; 260/47 R; 260/249 CS; 260/248 CS
[51] Int. Cl.² ..................................... C08G 73/06
[58] Field of Search .............. 260/47 R, 61, 248 CS, 260/79.3 M, 49, 47 CZ

[56] References Cited

UNITED STATES PATENTS

| 3,297,639 | 1/1967 | Picklesimer............................ 260/61 |
| 3,729,471 | 4/1973 | Robin, et al. ................. 260/248 CS |
| 3,738,962 | 6/1973 | Toudos, et al. .................... 260/47 R |
| 3,775,411 | 11/1973 | Brunetti........................ 260/248 CS |
| 3,784,504 | 1/1974 | Feasey et al. ......................... 260/61 |

FOREIGN PATENTS OR APPLICATIONS 1,305,762  2/1973  United Kingdom

*Primary Examiner*—Joseph L. Schofer
*Assistant Examiner*—Peter F. Kulkosky
*Attorney, Agent, or Firm*—Burgess, Dinklage & Sprung

[57] ABSTRACT s-Triazine prepolymers, useful in the preparation of polytriazines, are prepared by condensing an aromatic dihydroxy or polyhydroxy compound with less than one-third mol of cyanuric chloride per hydroxy group. Thereafter the free hydroxy groups in the condensation product are reacted with a cyanogen halide in the presence of a base. The condensation is preferably carried out in a melt at temperatures of from 100°–240°C.

11 Claims, No Drawings

PROCESS FOR PREPARING s-TRIAZINE PREPOLYMERS BY CONDENSATION OF AN AROMATIC POLYHYDROXY COMPOUND WITH CYANURIC CHLORIDE AND THEREAFTER REACTING THE CONDENSATION PRODUCT WITH CYANOGEN HALIDE IN THE PRESENCE OF BASE

BACKGROUND

This invention relates to a process for the production of s-triazine prepolymers.

It is known that difunctional or polyfunctional cyanic acid esters can be polymerised to form high molecular weight polytriazines (DT-AS No. 1,190,184). The polymerisation reaction is highly exothermic and involves relatively heavy shrinkage, proceeding by way of a so-called "B-state" (Kunststoffe Vol.58, page 829 (1968)). This gives rise to various disadvantages, especially in terms of processing, for example into glass-fibre-reinforced mouldings and, for example, in terms of the dimensional stability of the mouldings thus obtained. In order to avoid the disadvantages involved in direct polymerisation, it has already been proposed to obtain prepolymers by stopping polymerisation by cooling after about 30 to 65% of the cyanic acid ester groups have reacted (British Patent No. 1,305,762).

SUMMARY

It has now been found that s-triazine prepolymers can be obtained with advantage by condensing aromatic dihydroxy or polyhydroxy compounds with less than ⅓ mol of cyanuric chloride per hydroxy group, and subsequently reacting the free hydroxy groups of the resulting condensation product with a cyanogen halide in the presence of a base.

DESCRIPTION

Reaction of the aromatic dihydroxy or polyhydroxy compounds with cyanuric chloride can be carried out in the melt at temperatures in the range of from 100° to 250°C, preferably at temperatures in the range of from 150° to 220°C and more especially at temperatures in the range of from 170° to 200°C. Hydrogen chloride is formed simultaneously and escapes from the melt in the gaseous phase at those temperatures. In order to remove the hydrogen chloride, it is of course also possible to apply reduced pressure, preferably up to about 0.01 bar and more especially in the range of from about 0.2 to about 0.8 bar. However, the reaction can also be carried out in solution and/or suspension in the presence of about 1 mol of base per mol of hydrogen chloride to be eliminated at temperatures in the range of from about 0° to about 150°C, preferably at temperatures in the range of from 0° to about 100°C and, more especially, at temperatures in the range of from about 20° to 70°C.

Examples of suitable solvents for condensation in solution and/or suspension include water, lower aliphatic alcohols such as methanol, ethanol, propanol or isopropanol; aliphatic ketones such as acetone, methyl ethyl ketone, diethyl ketone, methyl isopropyl ketone or methyl isobutyl ketone; aliphatic or aromatic hydrocarbons, the aliphatic hydrocarbons preferably being the fractions accumulating during the distillation of naturally occurring mixtures, such as petroleum ether, light petrol or petrol, whilst the aromatic hydrocarbons used are, for example, benzene, toluene and the xylenes; aliphatic and aromatic chlorinated hydrocarbons such as dichloromethane, dichloroethane, perchlorethylene, chlorobenzene, dichlorobenzene; ethers such as diethyl ether or diisopropyl ether; and nitro hydrocarbons such as nitromethane, nitrobenzene or nitrotoluene.

Examples of suitable bases for condensation in solution and/or suspension are alkali metal hydroxides such as sodium hydroxide or potassium hydroxide; alkali metal carbonates such as sodium carbonate or potassium carbonate; alcoholates such as sodium methylate or potassium tert.-butylate; and also tertiary amines such as triethylamine, diethyl aniline and pyridine.

In general, reaction of the aromatic dihydroxy or polyhydroxy compounds with cyanuric chloride is carried out by combining the reactants in the selected quantities and heating them to the selected reaction temperature. The reaction is complete when the evolution of hydrogen chloride stops. By measuring the amount of hydrogen chloride given off, it is also possible to determine whether the theoretically calculated quantity has been eliminated and, hence, whether the reaction is over. In cases where condensation is carried out in the melt, there is generally no need for the condensation product to be further worked up and purified.

Condensation can also be carried out in solution and/or suspension. To this end, the dihydroxy or polyhydroxy compound is dissolved and/or suspended in the solvent selected and the corresponding quantities of cyanuric chloride and base are added. The individual reactants can be added in any order.

The progress of the reaction to completion can be followed by known analytical methods on the basis of the increase in concentration of chloride ions. On completion of the reaction, the reaction mixture can be worked up by standard methods. It is best first to separate off the hydrochloride of the base used which is formed as secondary product, or to dissolve it in water and separate off the aqueous solution. The solvent can then be removed, for example by distillation, and the product of condensation, hereinafter referred to as the condensate, isolated.

Subsequent reaction of the condensate formed with cyanogen halides can be carried out by known methods. For example, the condensate and cyanogen halide may be initially introduced in suspension and/or solution in a solvent, and the base added, optionally in solution. However, it is also possible initially to introduce the condensate and then to add the cyanogen halide and base, both optionally in solution, or initially to introduce the cyanogen halide and then to add the condensate and base, both optionally in solution.

Suitable solvents are the solvents used for the first stage of the process according to the invention. It is also possible to use the solvents normally used for reacting phenolic hydroxyl groups with cyanogen halide. The reaction can also be carried out in aqueous suspension and/or using mixtures or emulsions of the aforementioned solvents with water in solution, suspension or emulsion.

Suitable bases for this stage of the reaction are the bases mentioned in regard to the condensation stage, and also the bases normally used for the reaction of phenolic hydroxy groups with cyanogen halide.

Particularly suitable cyanogen halides are the commercially readily available cyanogen chloride and cyanogen bromide. A molar ratio of phenolic hydroxy group to cyanogen halide to base of 1:1:1 is generally maintained. However, it can be advantageous to use a slight excess of cyanogen halide. The reaction can be carried out at temperatures in the range of from −40° to +65°C, although it is preferably carried out at temperatures in the range of from 0° to 30°C. In cases where cyanogen chloride is used, the reaction is preferably carried out at temperatures below its boiling point (13°C), although, in cases where cyanogen bromide is used, the reaction can also be carried out at temperatures towards the upper end of the aforementioned temperature range, for example at temperatures above 50°C.

On completion of the reaction, the hydrochloric acid salt formed is separated off by known methods, the method used being governed by the particular type of solvent used. In purely organic solution, the hydrochloric acid salt formed is generally completely or partly precipitated and can be mechanically separated off by known methods. However, in cases where water-immiscible solvents are used, it can also be dissolved with water and separated off in the form of an aqueous solution. In cases where aqueous organic emulsions are used, it can be at least partly dissolved in the aqueous phase and completely dissolved by the addition of more water and separated off with the aqueous phase after breaking of the emulsion. The s-triazine prepolymer is obtained in high yields following removal of the solvent by the usual methods.

It can also be advantageous to carry out condensation and subsequent reaction of the condensate formed with cyanogen halide in a so-called one-pot process. In this case, it can also be advantageous to carry out condensation in the presence of a solvent and to use the same solvent and, optionally, the same base for both stages of the process.

Aromatic dihydroxy or polyhydroxy compounds suitable for use as starting compounds in the process according to the invention are known in large numbers. In practice, it is possible to use any aromatic and aromatic-heterocyclic, optionally substituted compounds with 2 or more phenolic hydroxy groups, providing the substituents, if any, are stable and do not themselves react under the conditions of the process according to the invention.

More particularly the aromatic hydroxy compounds suitable for use in the process according to the invention correspond to the general formula

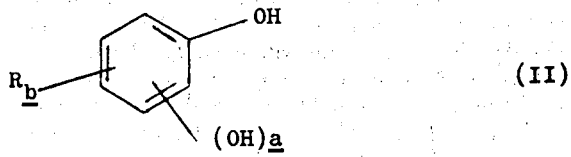
(II)

in which
R represents hydrogen, halogen, alkyl or phenyl; the various radicals R may be the same or different; or two radicals R which substitute adjacent carbon atoms can form with those carbon atoms a carbocyclic or heterocyclic 5-membered or 6-membered ring;
$a$ is the number 1, 2 or 3; and
$b$ is $5-a$,
$a$ preferably being the number 1 or 2, more especially the number 1.

Of the radicals R, one or two, more especially one, preferably have a meaning different from hydrogen, whilst the others represent hydrogen.

Another group of aromatic dihydroxy and polyhydroxy compounds which can be used in the process according to the invention corresponds in particular to the formula

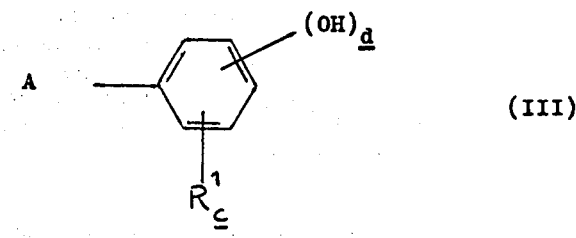
(III)

in which
A represents oxygen; the sulpho group (SO$_2$); the carbonyl group (CO); a CH$_2$-chain with up to 6 carbon atoms, preferably with up to 3 carbon atoms, optionally substituted by lower alkyl radicals, preferably methyl, or phenyl; a divalent cycloaliphatic or aromatic 5-membered or 6-membered ring; or a single bond;
R$^1$ has the same meaning as R above, or represents the group

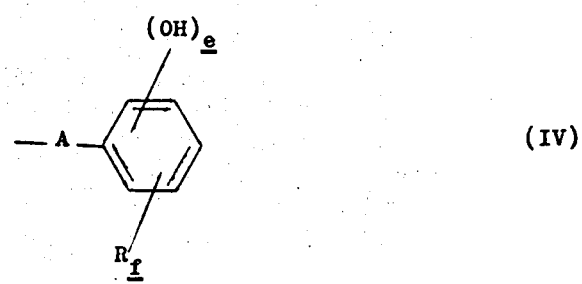
(IV)

in which
A and R are as defined above, and
$e$ is the number 1, 2 or 3, and
$f$ is $5-e$;
$c$ is $5-d$; and $d$ is the number 1, 2 or 3,
$d$ and $e$ preferably being the number 1 or 2, more especially the number 1.

Of the c radicals $R^1$ and f radicals R, one or two, more especially one, preferably have a meaning different from hydrogen, whilst the others represent hydrogen.

Of the halogens (fluorine, chlorine, bromine and and iodine), fluorine, chlorine and bromine are preferred.

Alkyl radicals are straight-chain and branched-chain alkyl radicals with up to 9 carbon atoms, preferably with up to 5 carbon atoms, for example, methyl, ethyl, propyl, isopropyl, n-butyl, isobutyl, t-butyl, and the isomeric pentyl radicals, more especially methyl and ethyl and tert.-butyl.

The following compounds are mentioned as examples of compounds corresponding to general formula II: o-, m-, p-dihydroxy benzene, 2-tert.-butyl hydroquinone, 2,4-dimethyl resorcinol, 2,5-di-tert.-butyl hydroquinone, tetramethyl hydroquinone, 2,4,6-trimethyl resorcinol, 2,6-di-tert.-butyl hydroquinone, 4-chlororesorcinol, 4-tert.-butyl pyrocatechol, dihydroxy naphthalenes such as, for example, 1,4-, 1,5-, 1,6-, 1,7-, 2,6- and 2,7-dihydroxy naphthalene.

The following compounds are mentioned as examples of compounds corresponding to general formula III: dihydroxy diphenyl such as, for example 4,4'-dihydroxy diphenyl, 2,2'-dihydroxy diphenyl, 3,3', 5,5'-tetramethyl-4,4'-dihydroxy diphenyl, 3,3', 5,5'-tetrachloro-4,4'-dihydroxy diphenyl, 3,3', 5,5'-tetrachloro-2,2'-dihydroxy diphenyl, 2,2', 6,6'-tetrachloro-4,4'-dihydroxy diphenyl, 4,4'-bis[(3-hydroxy)phenoxy]-diphenyl, 4,4'-bis[(4-hydroxy)phenoxy]-diphenyl, 2,2'-dihydroxy-1,1'-binaphthyl; dihydroxy diphenyl ethers, such as, for example 4,4'-dihydroxy diphenyl ether, 3,3',5,5'-tetramethyl-4,4'-dihydroxy diphenyl ether, 3,3',5,5'-tetrachloro-4,4'-dihydroxy diphenyl ether, 4,4'-bis[p-hydroxy phenoxy]-diphenyl ether, 4,4'-bis[p-hydroxy phenyl isopropyl]-diphenyl ether, 4,4'-bis[p-hydroxy-phenoxy]-benzene, 4,4'-bis[p-hydroxy-phenoxy]-diphenyl ether, 4,4'-bis[4(4-hydroxy phenoxy)-phenyl sulphone]-diphenyl ether; diphenyl sulphones, such as, for example, 4,4'-dihydroxy diphenyl sulphone, 3,3',5,5'-tetramethyl-4,4'-dihydroxy-diphenyl sulphone, 3,3', 5,5'-tetrachloro-4,4'-dihydroxy-diphenyl sulphone, 4,4'-bis[p-hydroxy phenyl isopropyl]-diphenyl sulphone, 4,4'-bis[(4-hydroxy)-phenoxy]-diphenyl sulphone, 4,4'-bis[(3-hydroxy)-phenoxy]-diphenyl sulphone, 4,4'-bis[4-(4-hydroxy phenyl-isopropyl)-phenoxy]-di-phenyl sulphone, 4,4'-bis[4-(4-hydroxy phenyl-sulphone)-phenoxy]-di-phenyl sulphone 4,4'-bis[4-(4-hydroxy)-diphenoxy]-diphenyl sulphone; dihydroxy diphenyl alkanes, such as, for example, 4.4'-dihydroxy-diphenyl methane, 4,4'-bis[p-hydroxy phenyl]-diphenyl methane, 2,2-bis-(p-hydroxy phenyl)-propane, 3,3',5,5'-tetramethyl-2,2-bis(p-hydroxy phenyl)-propane, 3,3',5,5'-tetrachloro-2,2-bis-(p-hydroxy phenyl)-propane, 1,1-bis[p-hydroxy phenyl]-cyclohexane, bis-[2-hydroxy-1-naphthyl]-methane, 1,2-bis[p-hydroxy phenyl]-1,1, 2,2-tetramethyl ethane, 4,4'dihydroxybenzo phenone, 4,4'-bis(4-hydroxy)phenoxy-benzophenone 1,4-bis[p-hydroxy phenyl isopropyl]-benzene, phloroglucinol, pyrogallol, 2,2',5,5'-tetrahydroxy-diphenyl sulphone.

The process according to the invention may be illustrated by the following reaction equations:

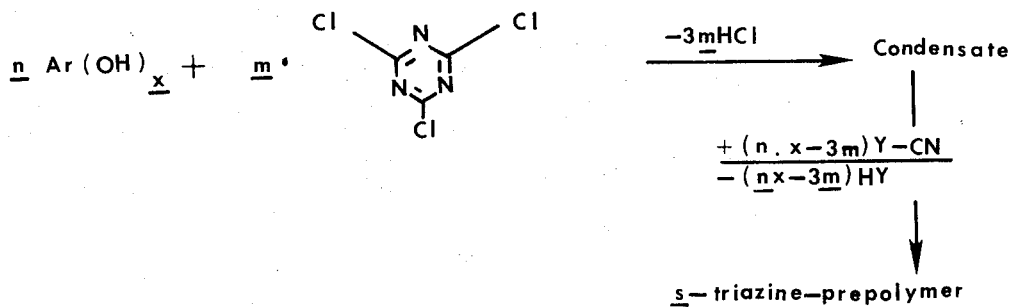

In this equation, Ar represents an aromatic radical, Y represents halogen, $x$ is a number from 2 to 6, $n$ and $m$ are integers which must satisfy the requirement $n \cdot x = 3m$.

The number of cyanate groups present in the s-triazine prepolymer can be calculated from the ratio of the numbers $n$, $m$ and $x$ from which the degree of crosslinking of the s-triazine prepolymer may also be determined.

The process according to the invention may be illustrated for example by the following exemplary equation in which the formulae for the condensate and the s-triazine prepolymer are reproduced in idealised form:

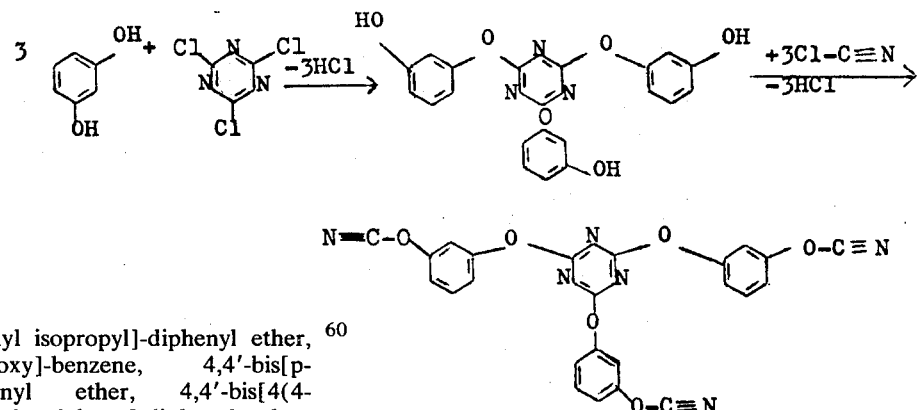

The process according to the invention has various advantages. The s-triazine prepolymers obtained are wax-like in consistency and can readily be processed. They do not contain any monomeric cyanic acid esters.

This is an advantage to the polymerisation reaction carried out at elevated temperature because some monomeric cyanic acid esters have extremely unpleasant properties (for example odour or irritation of the mucosa). As already mentioned, polymerisation of the s-triazine prepolymers, in contrast to polymerisation of the cyanuric acid esters, involves little or no shrinkage so that it is possible to obtain much more dimensionally stable mouldings.

The s-triazine prepolymers which can be obtained by the process according to the invention are valuable oligomers. They can be polymerised by known processes, for example by the process described in DT-AS No. 1,190,184, to form valuable high molecular weight polytriazines which are valuable high melting polymers useful in various fields e.g. for preparing fibre reinforced plastics casting resins or moulding resins, adhesives, coating compounds, laquers and varnishes.

In the following Examples, the s-triazine prepolymers obtained are referred to in short as "prepolymers".

EXAMPLE 1

68.4 g (0.3 mol) of 2,2-bis-(p-hydroxyphenyl)-propane and 18.4 g (0.1 mol) of cyanuric chloride are dissolved in 250 ml of acetone. 30.3 g (0.3 mol) of triethylamine are added dropwise at 20°C, and the reaction mixture is kept at a temperature of 50°C for 1 hour on completion of the reaction. The solvent is then distilled off and the residue taken up in 500 ml of water. The condensation product is filtered off under suction, washed with water and dried. Yield: 76 g (99% of the theoretical).

76 g (0.1 mol) of the condensate are dissolved in 200 ml of acetone, followed by the addition of 0°C of 20 g (0.33 mol) of cyanogen chloride. 30.3 g (0.3 mol) of triethylamine are added dropwise at 0°C to +5°C. The triethylamine hydrochloride is filtered off and the solvent distilled off. The residue is taken up in toluene and washed with water. 83 g (97% of the theoretical) of prepolymer are obtained after the toluene has been distilled off. The product obtained is easily identified by a characteristic band in the IR-spectrum for the —O—C ≡ N group at about 4.5 $\mu$.

EXAMPLE 2

18.4 g (0.1 mol) of cyanuric chloride dissolved in acetone are added to 33.0 g (0.3 mol) of resorcinol in 200 ml of alcohol. 120 ml of 10% NaOH are added dropwise to the resulting solution at room temperature. On completion of the reaction, the reaction solution is diluted with 1.5 liters of water and the condensate is filtered off and dried. Yield 39 g (95.5% of the theoretical).

30.3 g (0.3 mol) of triethylamine dissolved in 50 ml of methyl ethyl ketone are added dropwise at 0°C to 40.8 g (0.1 mol) of condensate and 20 g (0.33 mol) of cyanogen chloride in methyl ethyl ketone. On completion of the reaction, the hydrochloride precipitated is filtered off under suction, the methyl ethyl ketone is distilled off and the residue is taken up in methylene chloride. The organic phase is washed with water, dried and concentrated. Prepolymer is obtained in a yield of 44 g (91% of the theoretical). IR-spectrum: strong band at 4.5 $\mu$.

EXAMPLE 3

30.3 g (0.3 mol) of triethylamine are added dropwise at 20°C to 85.2 g (0.3 mol) of 3,3',5,5'-tetramethyl-2,2-bis-(p-hydroxyphenyl)-propane and 18.4 g (0.1 mol) of cyanuric chloride in 300 ml of acetone, and the mixture is kept for 2 hours at a temperature of 56°C. On completion of the reaction, the solvent is distilled off and the residue is taken up in 500 ml of water. The condensate is filtered off under suction, washed with water and dried. Yield: 92.5 g (99% of the theoretical).

20 g (0.33 mol) of cyanogen chloride and 400 ml of acetone are added at 0°C to 92.7 g (0.1 mol) of the condensate. 30.3 g (0.3 mol) of triethylamine dissolved in 100 ml of acetone are added dropwise at 0°C to 5°C. On completion of the reaction, the hydrochloride precipitate is filtered off under suction, washed with a little acetone and the filtrate concentrated. The residue is taken up in methylene chloride, washed with water, dried and concentrated by distilling off the solvent. Prepolymer is obtained in a yield of 90 g (90% of the theoretical). IR-spectrum: strong bank at 4.5 $\mu$.

EXAMPLE 4

18.4 g (0.1 mol) of cyanuric chloride dissolved in acetone are added to 33.0 g (0.3 mol) of hydroquinone dissolved in 200 ml of isopropanol. 30.3 g (0.3 mol) of triethylamine dissolved in 100 ml of isopropanol are added dropwise to that solution under a nitrogen atmosphere. On completion of the reaction, the reaction solution is stirred into 2 liters of water, and the condensate is filtered off and dried. Yield: 37 g (90% of the theoretical).

30.3 g (0.3 mol) of triethylamine dissolved in 50 ml of methyl ethyl ketone are added dropwise at 0°C to 40.8 g (0.1 mol) of condensate and 20 g (0.33 mol) of cyanogen chloride. On completion of the reaction, the hydrochloride precipitated is filtered off under suction, the solvent distilled off and the residue taken up in methylene chloride. The organic phase is washed with water, dried and concentrated. Prepolymer is obtained in a yield of 42 g (87% of the theoretical). IR-spectrum: strong-OC ≡ N band at 4.5 $\mu$.

EXAMPLE 5

55.8 (0.3 mol) of 4,4'-dihydroxy diphenyl and 18.4 g (0.1 mol) of cyanuric chloride are reacted together in the presence of 30.3 g (0.3 mol) of triethylamine in the same way as described in Example 1. Yield of condensation product: 59 g (93% of the theoretical).

63.2 g (0.1 mol) of the condensate are reacted with 20 g (0.33 mol) of cyanogen chloride and 30.3 g (0.3 mol) of triethylamine in the same way as described in Example 1.

Yield of prepolymer with a strong IR-band at 4.5 $\mu$: 64 g (90% of the theoretical).

EXAMPLE 6

60.6 g (0.3 mol) of 4,4'-dihydroxy diphenyl ether and 18.4 g (0.1 mol) of cyanuric chloride are reacted together in the presence of 30.3 g (0.3 mol) of triethylamine in the same way as described in Example 1. Yield of condensation product: 60 g (87.5% of the theoretical).

68 g (0.1 mol) of the condensate are reacted with 20 g (0.33 mol) of cyanogen chloride and 30.3 g (0.3 mol) of triethylamine in the same way as described in Example 1. Yield of prepolymer: 68 g (90% of the theoretical).

EXAMPLE 7

43.4 g (0.3 mol) of 4-chlororesorcinol and 18.4 g (0.1 mol) of cyanuric chloride are reacted together in the presence of triethylamine in the same way as described in Example 4. Yield: 48 g (94.5% of the theoretical).

50.8 g (0.1 mol) of the resulting condensate and 20 g (0.33 mol) of cyanogen chloride are reacted with triethylamine in the same way as described in Example 4. Yield of prepolymer: 50.5 g (86.5% of the theoretical).

EXAMPLE 8

66.6 g (0.3 mol) of 2,5-di-tert.-butyl hydroquinone and 18.4 g (0.1 mol) of cyanuric chloride are reacted together in the presence of triethylamine in the same way as described in Example 4. Yield of condensate: 73 g (98.5% of the theoretical).

74 g (0.1 mol) of the condensate are reacted with cyanogen chloride and triethylamine in the same way as described in Example 4. Yield: 80 g (98% of the theoretical) of prepolymer.

EXAMPLE 9

34.6 g (0.1 mol) of 1,4-bis-(p-hydroxyphenyl isopropyl)-benzene and 6.1 g (0.03 mol) of cyanuric chloride are reacted together in the presence of triethylamine in the same way as described in Example 1. Yield of condensate: 37 g (100% of the theoretical).

37 g (0.03 mol) of the condensate are reacted with 6.6 g (0.11 mol) of cyanogen chloride and 10.1 g (0.1 mol) of triethylamine in the same way as described in Example 1. Yield of prepolymer: 37 g (92.5% of the theoretical).

EXAMPLE 10

22 g (0.2 mol) of resorcinol are reacted with 18.4 g (0.1 mol) of cyanuric chloride and 30.3 g (0.3 mol) of triethylamine in the same way as described in Example 4. Yield of condensate: 29 g (98.5% of the theoretical).

29.5 g (0.1 mol) of the condensate are reacted with 6.6 g (0.11 mol) of cyanogen chloride and 10.1 g (0.1 mol) of treithylamine in the same way as described in Example 4. Yield of prepolymer with a weak-O-C ≡ N band in the infrared spectrum at 4.5μ: 31 g (97% of the theoretical).

What is claimed is:

1. Process for preparing s-triazine prepolymers which comprises contacting under condensation conditions an aromatic dihydroxy or polyhydroxy compound with less than ⅓ mol of cyanuric chloride per hydroxy group, thereafter reacting the free hydroxy groups in the condensation product with a cyanogen halide in the presence of a base.

2. Process of claim 1 wherein the condensation is carried out in the melt at a temperature of from 100° to 250°C.

3. Process of claim 2 wherein the temperature is from 150° to 200°C.

4. Process of claim 1 wherein the condensation is carried out in solution and/or suspension in the presence of substantially 1 mol of base per mol of hydrogen chloride to be eliminated at a temperature in the range of from 0° to 150°C.

5. Process of claim 4 wherein the temperature is from 0° to 100°C.

6. Process of claim 1 wherein the reaction of the condensation product with the cyanogen halide is carried out in the presence of a base at a temperature in the range of from −40° to +65°.

7. Process of claim 6 wherein the temperature is from 0° to 30°C.

8. Process of claim 1 wherein the aromatic dihydroxy or polyhydroxy compound has the formula

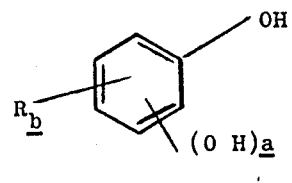

wherein
R which may be the same or different is hydrogen, halogen, alkyl or phenyl; or two R's may substitute adjacent carbon atoms and form with those carbon atoms a carbocyclic or heterocyclic 5-membered or 6-membered ring;
$a$ is 1, 2 or 3; and
$b$ is 5 minus $a$.

9. Process of claim 1 wherein the aromatic dihydroxy or polyhydroxy compound has the formula

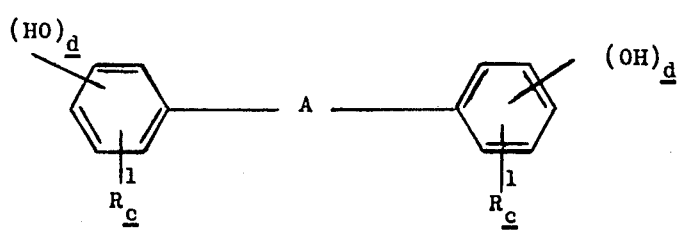

wherein
A is oxygen; a sulpho group ($SO_2$); a carbonyl group (CO); a $CH_2$-chain with up to 6 carbon atoms optionally substituted by at least one lower alkyl radical or phenyl; a divalent cycloaliphatic or aromatic 5-membered or 6-membered ring; or a single bond;
$R^1$ is the same as R in claim 8 or is the group

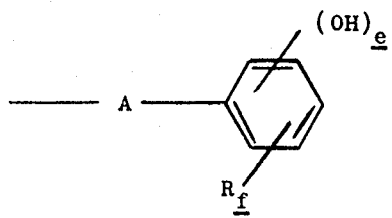

wherein
A and R are as defined previously;
$e$ is 1, 2 or 3; and
$f$ is 5 minus $e$;
$c$ is 5 minus $d$; and
$d$ is 1, 2 or 3.

10. Process of claim 9 wherein A is a $CH_2$-chain with up to 3 carbon atoms.

11. Process of claim 9 wherein the lower alkyl radical is methyl.

* * * * *

UNITED STATES PATENT AND TRADEMARK OFFICE
CERTIFICATE OF CORRECTION

PATENT NO. : 3,978,028
DATED : August 31, 1976
INVENTOR(S) : Rudolf Sundermann et al It is certified that error appears in the above-identified patent and that said Letters Patent are hereby corrected as shown below:

Abstract, last line, change "240°C" to --250°C--.

Signed and Sealed this

Eighth Day of February 1977

[SEAL]

Attest:

RUTH C. MASON
*Attesting Officer*

C. MARSHALL DANN
*Commissioner of Patents and Trademarks*